(12) United States Patent
McClean et al.

(10) Patent No.: US 9,503,181 B2
(45) Date of Patent: Nov. 22, 2016

(54) RARE EARTH-DOPED FIBER AMPLIFIER WITH INTEGRAL OPTICAL METROLOGY FUNCTIONALITY

(71) Applicant: II-VI Incorporated, Saxonburg, PA (US)

(72) Inventors: Ian Peter McClean, Brixham (GB); Aravanan Gurusami, Morgan Hill, CA (US)

(73) Assignee: II-VI Incorporated, Saxonburg, PA (US)

( * ) Notice: Subject to any disclaimer, the term of this patent is extended or adjusted under 35 U.S.C. 154(b) by 33 days.

(21) Appl. No.: 14/590,460

(22) Filed: Jan. 6, 2015

(65) Prior Publication Data

US 2016/0197673 A1 Jul. 7, 2016

(51) Int. Cl.
| | | |
|---|---|---|
| *H04B 10/00* | (2013.01) | |
| *H04B 10/079* | (2013.01) | |
| *H04B 10/50* | (2013.01) | |
| *H04B 10/071* | (2013.01) | |
| *G01M 11/00* | (2006.01) | |
| *H04J 14/00* | (2006.01) | |

(52) U.S. Cl.
CPC .... *H04B 10/07955* (2013.01); *G01M 11/3154* (2013.01); *H04B 10/071* (2013.01); *H04B 10/503* (2013.01)

(58) Field of Classification Search
CPC .............. H04B 10/071; H04B 10/291; H04B 10/2912
USPC ......................................... 398/175; 356/73.1
See application file for complete search history.

(56) References Cited

U.S. PATENT DOCUMENTS

| | | |
|---|---|---|
| 5,298,965 A | 3/1994 | Spirit et al. |
| 5,528,404 A | 6/1996 | MacKichan |
| 6,507,679 B1 | 1/2003 | Hodgson et al. |
| 6,519,082 B2 | 2/2003 | Ghera et al. |
| 6,850,360 B1 | 2/2005 | Chen et al. |
| 7,088,436 B2 | 8/2006 | Saunders et al. |

(Continued)

FOREIGN PATENT DOCUMENTS

| | | |
|---|---|---|
| EP | 1175744 B1 | 9/2003 |
| WO | WO2011045633 | 4/2011 |

OTHER PUBLICATIONS

Nascimento, et al., "Amplified OTDR Systems for Multipoint Corrosion Monitoring", Sensors 2012, pp. 3438-3448.

*Primary Examiner* — Daniel Dobson
(74) *Attorney, Agent, or Firm* — Wendy W. Koba

(57) ABSTRACT

A doped fiber amplifier (e.g., an erbium-doped fiber amplifier—EDFA) module is configured to include metrology functionality for performing real-time measurements of the fiber spans connected to the EDFA. In one embodiment, a separate component utilized to perform optical time domain reflectometry (OTDR) measurements is embedded with the EDFA module. The OTDR measurement component includes its own laser source and detector, which are used to analyze the input and output fiber spans associated with the EDFA. In another embodiment, the pump laser of the EDFA is also used as the optical probe light source for the OTDR component, where the source is either "switched" or "shared" between performing amplification and providing OTDR measurements. In yet another embodiment, a "dual pump" source is included with the OTDR component itself and modified to utilize one laser for amplification and the other for OTDR purposes.

20 Claims, 11 Drawing Sheets

(56) References Cited

U.S. PATENT DOCUMENTS

| | | |
|---|---|---|
| 7,215,415 B2 | 5/2007 | Maehara et al. |
| 7,280,188 B2 | 10/2007 | Schmuck et al. |
| 8,792,091 B2 | 7/2014 | McClean et al. |
| 2002/0060837 A1* | 5/2002 | Inagaki ............... H01S 3/06758 359/337 |
| 2002/0140927 A1* | 10/2002 | Sobe ................... G01M 11/3145 356/73.1 |
| 2011/0158655 A1* | 6/2011 | Meissner ............ G01M 11/3145 398/195 |
| 2012/0182023 A1 | 7/2012 | Zhang et al. |
| 2014/0077971 A1 | 3/2014 | Archambault et al. |
| 2014/0105595 A1 | 4/2014 | Grasso et al. |

* cited by examiner

RARE EARTH-DOPED FIBER AMPLIFIER WITH INTEGRAL OPTICAL METROLOGY FUNCTIONALITY

TECHNICAL FIELD

The present invention relates to a doped fiber amplifier (such as an erbium-doped fiber amplifier, or EDFA) and, more particularly, to a doped fiber amplifier that is particularly configured to include functionality utilized to perform various types of measurements/characterizations of an associated optical fiber span.

BACKGROUND

When installing new sections of optical fiber within a communication network, knowledge of the optical characteristics of the fiber span is required in order to properly configure the various devices (e.g., optical amplifiers) deployed along the span. In most cases, the information associated with the fiber span characteristics takes the form of off-line documentation that accompanies the fiber span to the point of installation. In some cases, this documentation is either missing or incorrect, thus requiring the span to be measured in real time and its characteristics obtained so that the associated devices can be properly tuned for their best performance. Additionally, various diagnostic tests are generally performed once a fiber is installed, since a number of devices are best configured once the installation environment is known.

Methods to try and automate this span analysis are known in the prior art. Most of these arrangements are specially designed for systems that provide Raman amplification and, therefore, are not directly applicable to systems utilizing rare-earth doped fiber amplifiers.

SUMMARY OF THE INVENTION

The needs remaining in the prior art are addressed by the present invention, which relates to a doped fiber amplifier that is particularly configured to include functionality utilized to perform various types of measurements/characterizations of an associated optical fiber span.

In accordance with the present invention, a conventional EDFA module is modified in a manner that allows for the module to include metrology functionality. In one embodiment, a separate component utilized to perform a selected type of optical metrology (e.g., optical time domain reflectometry (OTDR) measurements, chromatic dispersion measurements, fiber span type and length measurements) is embedded with the EDFA module. The metrology component includes its own light source and detector, which are used to analyze the input and output fiber spans associated with the EDFA.

In another embodiment, the pump laser of the EDFA is also used as the optical source for the optical metrology component, where the source is either "switched" or "shared" between performing amplification and providing specific optical measurements/characterizations. In yet another embodiment, a "dual pump" source is included with the metrology component itself and modified to utilize one laser for amplification and the other for metrology purposes. Various metrology functions (e.g., measurement of chromatic dispersion, determination of fiber length and type, etc.) are provided by using a tunable laser source within the embedded metrology component.

In one specific embodiment, the present invention takes the form of an optical communications device coupled to an input fiber span at an input port and an output fiber span at an output port, and the device comprises a doped fiber amplifier coupled between the input fiber span and the output fiber span, and an optical metrology arrangement coupled to one or more of the input port, output port and doped fiber amplifier. The optical metrology arrangement includes an optical source for introducing probe light (i.e., a "test" signal for measurement purposes) along either one or both of the input fiber span and the output fiber span, and a photoreceiver for accepting the reflected probe test signal and measure the reflected optical power in a manner that is utilized to determine optical characteristics of the associated optical fiber span.

Other and further aspects and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
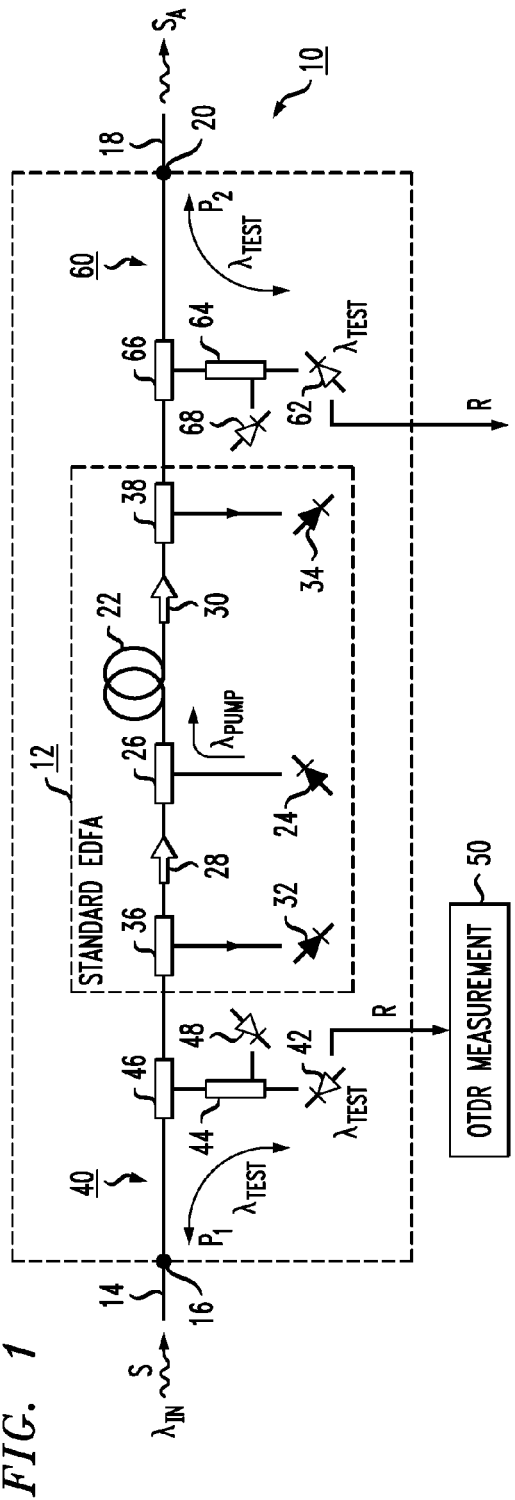
FIG. 1 illustrates a first embodiment of an integrated EDFA and optical metrology module, in this case utilizing separate optics for the optical fiber measurement purposes (in this case, OTDR functionality) at both the input and output of a conventional EDFA, with FIG. 1A displaying a typical plot of fiber characteristics that may be created from OTDR measurements.

FIG. 1 illustrates an exemplary integrated EDFA and optical metrology module 10, formed in accordance with the present invention. As with every embodiment described below, various alternative configurations of conventional EDFA component 12 may be used in module 10 to provide optical amplification of a communication signal S. In the arrangement as shown in FIG. 1, input communication signal S propagates toward module 10 on an input optical fiber span 14, where input fiber span 14 is coupled to module 10 at an optical input port 16. In accordance with the known properties of an EDFA, an amplified version of input signal, denoted $S_A$, will be created within EDFA component 12. This amplified version of the input signal is thereafter coupled into an output optical fiber span 18 connected to an output port 20 of module 10. EDFA component 12 is shown to include a section of erbium-doped optical fiber 22 that supports the propagation of communication signal S as it passes through module 10 from input port 16 to output port 20. A pump laser source 24 is used to provide a separate optical input to doped fiber 22, in this case utilizing a wavelength division multiplexer (WDM) 26 to couple the pump light at $\lambda_{pump}$, into doped fiber 22 in a manner such that this pump light will co-propagate with input communication signal S operating at a wavelength within doped fiber 22.

As is well known in the art, the value of $\lambda_{pump}$ is selected to provide optical amplification to an communication signal operating at $\lambda_{IN}$ in the presence of a specific rare-earth dopant within the optical fiber. For the purposes of the present invention, it will be presumed that the dopant is erbium (although other elements—ytterbium, for example—may be used) and the pump source is chosen to exhibit a wavelength of 980 nm (the wavelength associated with providing amplification of an optical communication signal propagating through a section of erbium-doped fiber); other pump sources may be appropriate for use with other communication wavelengths, the value of 1550 nm is considered as exemplary only). A pair of optical isolators is included within EDFA 12, with a first optical isolator 28 disposed at the input of doped fiber 22, and a second optical isolator 30 coupled to the output of doped fiber 22. Isolators 28 and 30 are used in the manner well-known in the art to prevent spontaneously-generated light, as well as unused pump light, from propagating in either direction along the communication fiber.

Photodiodes 32 and 34 are included at the input and output of EDFA 12 and are coupled via optical taps 36 and 38, respectively, to the input and output signals of EDFA 12. While optional, photodiodes 32 and 34 are preferably used to measure the power of the arriving communication signal at the input to EDFA 12, as well as the "amplified" power of the communication signal exiting EDFA 12, thus providing an indication of the amount of gain provided by EDFA 12. The operation of EDFA 12 is considered to be well-known in the art and the details of specific configurations may differ slightly in operation from this description. Indeed, it is to be understood that the metrology portion of the present invention may be used with various EDFA configurations, not only the specific arrangement shown in these diagrams.

In accordance with this specific embodiment of the present invention, module 10 is shown as further comprising optical components utilized to perform optical time domain reflectometry (OTDR) measurements of either input fiber span 14, output fiber span 18, or both fiber spans 14 and 18. OTDR is a measurement technique where, for example, light is sent into an optical fiber (or any other type of light-guiding medium) and the reflections coming back towards the source are captured and measured over a period of time. The reflections can be used, for example, to determine what losses exist in the fiber, such as those associated with Fresnel reflections at connectors, bad splices, or Rayleigh backscatter (which is the reflection derived from the nature of the fiber/waveguide structure itself). While many OTDR systems utilize pulses of pump light, other configurations may use CW light (all generally referred to as "probe light") and/or may instead be based upon performing a correlation coding analysis of propagating signals, measuring an infinite backscatter signal, or any other suitable mechanism. It is to be understood that the specific implementation of an OTDR scheme is not relevant for the purposes of the present invention, inasmuch as any appropriate type of OTDR configuration may be integrated with a doped fiber amplifier and provide the desired metrology functionality.

Figure 1A:
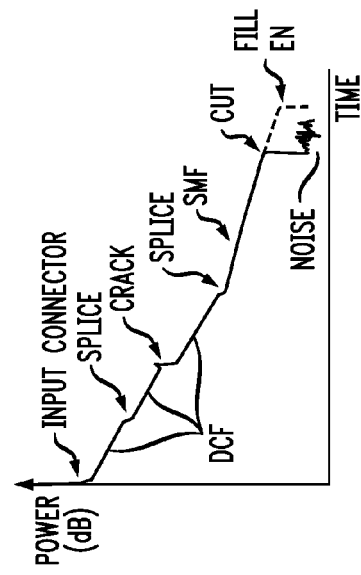

FIG. 1A is an example of an OTDR diagram, illustrating a measured power of a returned (reflected) signal as a function of time. In the plot of FIG. 1A, the reflected signal power (i.e., reflected light from the OTDR measurement component) is plotted as a function of time. If desired, the time scale on the x-axis of the graph may be converted into a distance scale based on the known characteristics of the fiber span being measured (for example, by knowing the group velocity of the OTDR probe light). The y-axis (power) in FIG. 1A is plotted on a log (dB) scale, in particular on a "5log" scale instead of a conventional "10 log" scale, since the signal will make two passes through the system.

The trace illustrated in the diagram shows a number of features that are present in an illustrative fiber span. For example, the presence and location of splices, cracks, cuts, and connectors may be determined. The physical properties of a fiber span are shown in the diagram of the returned probe light as areas where the slope is not smooth, and are known as "events". The slope of line A is equivalent to the fiber loss per kilometer. The received optical signal (Rayleigh backscatter signal) is about 45 dB down from the launched probe light (in this particular example, a one microsecond pulse). Examples of events on the link include, but are not limited to, bad splices (shown at B), bends in the fiber (shown at C, where the bend is sufficient to induce loss) and flattened fiber (shown at D). The trace may also be used to assist in determining the specific type(s) of fiber installed along the span. Different fiber types may be used for different sections of a given span. For example, the fiber span may contain standard single mode fiber (SMF) or dispersion-compensating fiber (DCF) or other fiber types. Different types of fiber may be characterized by their loss per unit length and effective core area ($A_{eff}$). When the trace is plotted on a log scale (as shown in FIG. 1A), the slope of the trace in a given region is inversely related to $A_{eff}$. Referring to FIG. 1A, the trace indicates that two different types of fiber were installed along the span, SMF and DCF, as evidenced by the characteristic slopes.

It is necessary to inject light into the fiber span in order to develop information regarding either loss measurements or parameter diagnostics, and then perform an analysis of the reflected optical signal(s). Module 10, as shown in FIG. 1, includes components capable of performing the required types of fiber span analyses, incorporated within the same packaging as the EDFA itself.

In the specific embodiment of FIG. 1, module 10 includes a first fiber span analysis arrangement 40 disposed at input port 16 of module 10. Arrangement 40 comprises a laser source 42 that is used to inject light at a desired test wavelength (denoted $\lambda_{test}$) in a backward direction along the communication path 14. In this particular example, laser source 42 is configured to generate a probe signal in the form of optical pulses $P_1$ (also referred to as "probe pulses"). As shown, probe pulses P, are injected to propagate upstream along input optical fiber span 14, counter-propagating with respect to communication signal S traveling toward module 10. In those situations where pulsed light is used as the probe signal by the OTDR, the pulse power, pulse width, repetition rate and averaging time are all configured in accordance with the length of fiber span to be measured (as well as the resolution of the measurement).

Probe pulses $P_1$ are generated within first analysis arrangement 40 by an included laser source 42. Probe pulses P, then pass through a circulator 44 and are coupled into a WDM 46 disposed along the input path of module 10. It is to be understood that various other types of coupling arrangements may be used in place of a circulator, such as a tap coupler, splitter, or the like. Returning to the description of FIG. 1, WDM 46 is configured to couple any signal operating at wavelength $\lambda_{test}$ into only optical fiber span 14 (and thus prevent any of the pulses From entering EDFA 12). In accordance with well-known OTDR functionality, pulses $P_1$ will propagate along fiber span 14, with reflections associated with any of the characteristics described above (with respect to FIG. 1A) traveling hack along the span and re-entering module 10 at port 16. The reflected signals at $\lambda_{test}$ will be re-directed by WDM 46 out of the communication signal path, so as to re-enter circulator 44 within first fiber span analysis arrangement 40. Circulator 44 will thereafter direct this return signal into a photoreceiver 48, which functions to convert the returned optical signal into an equivalent electrical representation R. Electrical signal R is then used in conventional fashion to measure the returned optical power and enable an external processor arrangement 50 to generate a plot such as that shown in FIG. 1A and thus ascertain the specific characteristics of input fiber span 14.

A second fiber span analysis arrangement 60 is also shown as being included within module 10 and is disposed to perform measurements on output fiber span 18. As with first fiber span analysis arrangement 40, second analysis arrangement 60 includes a laser source 62 used to generate probe light—again in this case in the form of pulses denoted $P_2$—at the desired test wavelength $\lambda_{test}$. The probe pulses pass through a circulator 64 and a WDM 66, where WDM 66 is configured to inject probe pulses $P_2$ "downstream" along output fiber span 18. The return reflected signal re-enters WDM 66 and circulator 64, which directs the reflected signal into a photoreceiver 68 which converts the returned optical signal into an equivalent version R. The electrical signal R is thereafter into the same external processor arrangement 50 (or another processor, as the case may be). Again, the reflected optical power measured by photoreceiver 68 is utilized to generate an OTDR trace, as shown in FIG. 1A, to provide information regarding the optical characteristics (including fiber type) associated with output fiber span 18.

In accordance with this arrangement of the present invention, the choice of wavelength to use for $\lambda_{test}$ is not constrained to be the same as that used by the pump source for amplification (as will be for other embodiments, described below). Thus, the wavelength chosen for the OTDR probe light can be selected to exhibit low loss in the region of the wavelength associated with communication signal S (typically, $\lambda_{IN}$=1550 nm). Indeed, the OTDR wavelength may be selected to reside well outside of the bandwidth associated with the communication signal, where this will minimize any interaction of the test signal with the communication signal and thus allow for the OTDR testing to be performed at the same time that "live" traffic is passing through module 10. For example, values of $\lambda_{test}$ on the order of 1625-1675 nm (defined as the "maintenance band" in ITU-T Recommendation L.66) have been found useful for this function.

Figure 2:
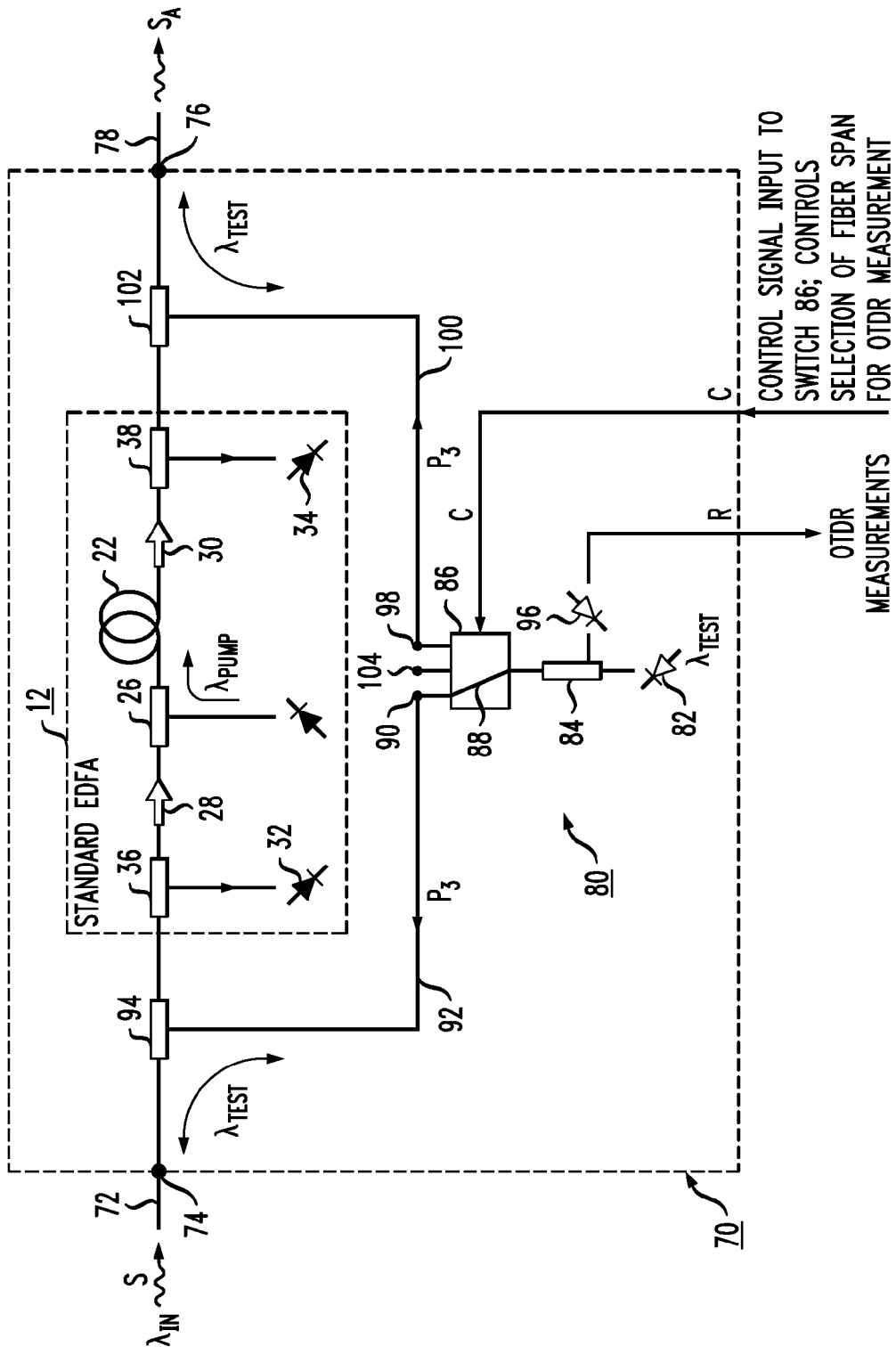
FIG. 2 is an alternative arrangement of this first embodiment of FIG. 1, where a switching element is included with the OTDR functionality to select the specific span of fiber that will be characterized.

It is to be understood that the embodiment of FIG. 1 may be modified to include only first fiber span analysis arrangement 40 or second fiber span analysis arrangement 60, if it is desired to test only either the incoming fiber span 14 or outgoing fiber span 18, respectively. Moreover, it is possible to re-configure the embodiment of FIG. 1 to reduce the number of optical components required to perform the metrology operations by creating an OTDR component that selects between testing either fiber span. FIG. 2 illustrates this alternative configuration of the embodiment of FIG. 1, denoted as integrated EDFA-OTDR module 70. As shown, EDFA 12 remains the same as utilized within module 10 (although it is to be understand that any type of EDFA component may be used in conjunction with the optical metrology functions of the present invention). Module 70 is further shown as receptive to a communication signal S arriving from an input fiber span 72 at an input port 74. An amplified version of this signal $S_A$ thereafter exits module 70 at output port 76 and is coupled into an output fiber span 78.

In accordance with this embodiment of the present invention, a switchable fiber span analysis arrangement 80 is disposed within module 70 and is coupled to both the input and output of EDFA 12 in a manner that either input fiber span 72 or output fiber span 78 may be analyzed. As shown, switchable analysis arrangement 80 includes a laser source 82, utilized to create a probe light signal $P_3$. In this embodiment, probe light $P_3$ passes through a circulator 84 (or other suitable coupling/tap arrangement) and is applied as an input to an optical switch 86. Optical switch 86 is shown in this embodiment as a three-way switch that is activated by an external control signal C. A first state of optical switch 86 is illustrated in FIG. 2, where an optical path 88 within switch 86 is disposed to couple to a first output port 90, associated with an optical signal path 92 and an input WDM 94. When optical switch 86 is controlled to be in this position, probe light $P_3$ will pass through input WDM 94 and be injected upstream into input fiber span 72 (so as to counter-propagate with respect to communication signal S). As with the embodiment of FIG. 1, reflected signals associated with this probe light will be directed by input WDM 94 back into analysis arrangement 80, pass through switch 86 (re-entering at port 90) and enter circulator 84. Circulator 84 will direct this return signal into a photoreceiver 96, which converts into the electrical equivalent R for use in conventional OTDR analyses (perhaps using external processing capabilities, as mentioned above).

If instead, it is desired to perform testing on output fiber span 78, control signal C applied to switch 86 is used to re-direct optical path 88 within switch 86 from first output port 90 to a second output port 98. As shown, second output port 98 is coupled to an optical signal path 100 which is thereafter connected as an input to an output WDM 102 at the output of EDFA 12. In this state of switch 86, therefore, probe light $P_3$ will exit switch 86 at second output port 98, propagate along signal path 100 and enter output WDM 102. Output WDM 102 functions to inject probe light P, into output fiber span 78, with the return (reflected) signals re-entering analysis arrangement 80 and ultimately into photoreceiver 96.

As with the configuration of FIG. 1, the embodiment of FIG. 2 may utilize any desired wavelength for the OTDR probe light, and may use a CW signal or a train of separate pulses. In the illustrated embodiment, optical switch 86 is shown as including a third output port 104. When controlled to couple optical signal path 88 to third output port 104 (by operation of control signal C), the OTDR functionality will be bypassed, and module 70 will function only as an in-line EDA amplifier.

While the embodiments shown in FIGS. 1 and 2 have the advantages that the analysis arrangements may be used with any of a variety of different EDFA modules (since the arrangements are only connected to the input and output terminals of the EDFA) and may utilize any suitable wavelength for the probe light, the resultant modules are larger in size (when compared to a conventional EDFA module) and may result in increasing the cost and complexity of the EDFA modules.

Figure 3:
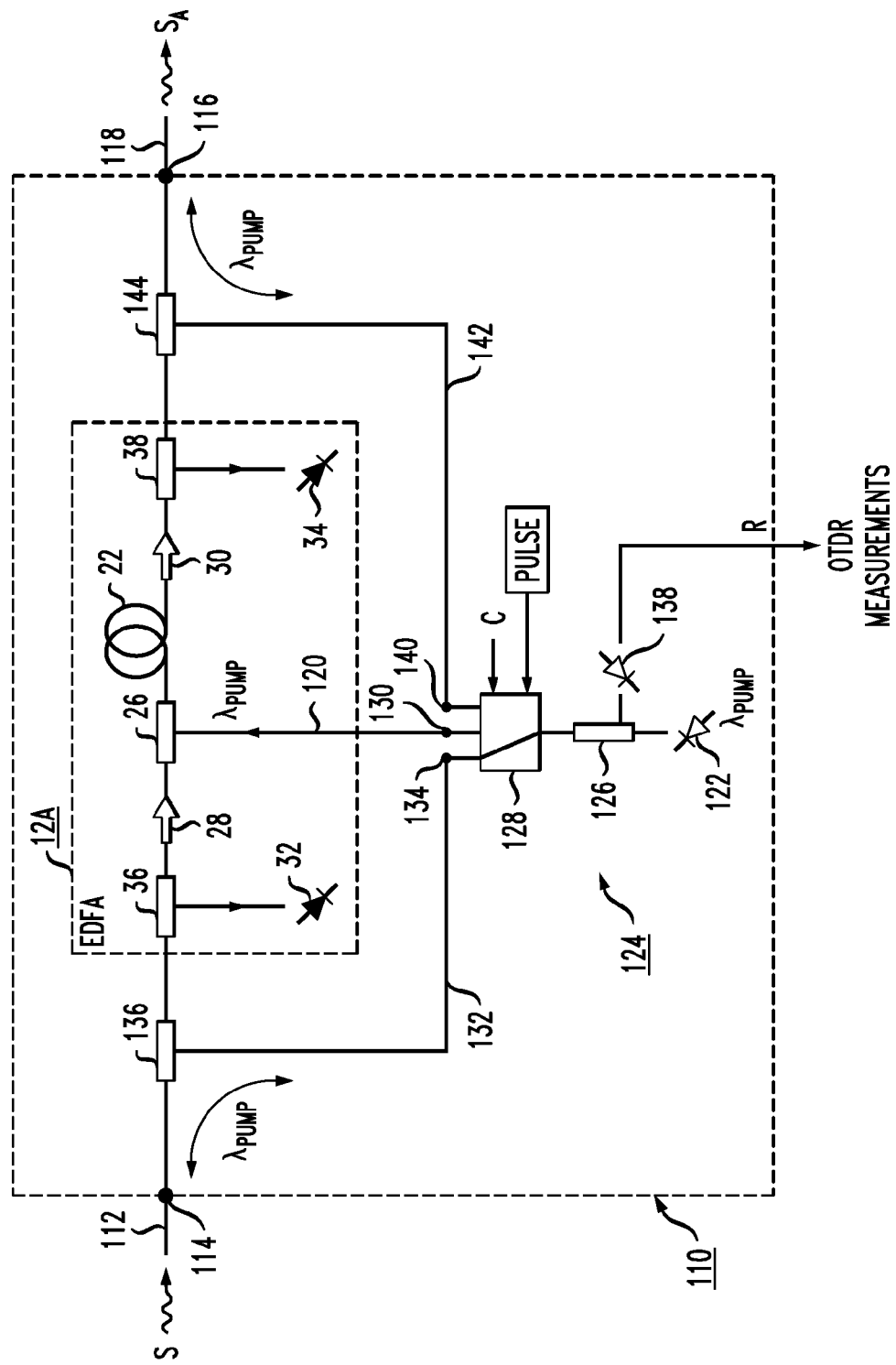
FIG. 3 illustrates a second embodiment of an integrated EDFA and OTDR formed in accordance with the present invention, in this case where the pump laser used for amplification is also used to perform the OTDR functionality, as controlled by a switch that allows for either amplification or characterization to be performed.

FIG. 3 illustrates an alternative embodiment of an integrated EDFA and optical metrology module 110, where this configuration exhibits a savings in both cost and size by utilizing the same laser source for both the pump light applied to the EDFA and the probe light used by the OTDR. Similar to all embodiments of the present invention, a communication signal S to be amplified propagates along an input fiber span 112 and enters module 110 at an input port 114. After being amplified, die communication signal S, exits module 110 at an output port 116 and thereafter propagates along an output fiber span 118. As shown, module 110 includes an EDFA component 12A which is a slightly modified version of the amplification arrangement described above. In particular, EDFA component 12A of module 110 does not include its own, separate source of pump light. Instead, an optical signal path 120 is shown as a separate input to EDFA 12A. In accordance with this embodiment of the present invention, the pump signal originates from an external source, as described below, and is coupled into optical signal path 120. Upon entering EDFA component 12A, the pump signal is thereafter applied as an input to WDM 26 and coupled into doped fiber 22 to provide amplification to the co-propagating communication signal S (in the manner well-known in the art).

In accordance with this embodiment of the present invention, the pump signal applied to EDFA component 12A is created by a pump source 122 that is contained within a fiber analysis arrangement 124. As shown, the optical output from pump source 122 passes through a circulator 126 (or other suitable tap/coupling element) and is thereafter applied as an input to an optical switch 128 (again, a 3-way switch similar to that shown in FIG. 2). In this case, when the pump light exits switch 128 at a first output port 130, it will be coupled into signal path 120 and introduced into doped fiber 22 so as to perform amplification on the communication signal S propagating through EDFA 12A.

In further accordance with the present invention, this same laser source 122 is also used to provide the probe light used to perform OTDR measurements on the input and output fiber spans. As shown, fiber analysis arrangement 124 further includes a first optical signal path 132 that is coupled to a second output port 134 of optical switch 128. When switch 128 is controlled such that laser source 122 is coupled to second output port 134, the output from laser source 122 will be defined as the "probe light". Thus, as shown in FIG. 3, the probe light will thereafter propagate along signal path 132 and be coupled into an input WDM 136, used in the same manner described above to inject the optical probe light into input fiber span 112. If it is desired to utilize pulses as the OTDR test light, a pulse generator 135 may be included within fiber analysis arrangement 124 to create probe pulses.

As with the embodiments discussed above, the reflected probe light propagating along input fiber span 112 will re-enter module 110 at port 114 and be directed by input WDM 136 onto signal path 132 and through switch 128 and circulator 126 into a photoreceiver 138. The received power measurements R are then used to create OTDR diagrams similar to that shown in FIG. 1A to ascertain various characteristics of input fiber span 112. Similar to the configuration of FIG. 2, the position of optical switch 128 can be controlled to provide analysis of either input fiber span 112 or output fiber span 118. That is, optical switch 128 includes a third output port 140, with an optical signal path 142 coupled between third output port 140 and an output WDM 144 located at the output of EDFA 12A. Again, if it is desired to uses pulses of light as the OTDR probe, pulse generator 134 will inject pulses on the supplied CW pump light from source 122. A pulsed version of the pump will be coupled into signal path 142 and thereafter directed by output WDM 144 onto output fiber span 118. The reflected return signal will similarly pass through analysis arrangement 124, so as to be received by photoreceiver 138, converted into a received electrical signal R and thereafter transmitted to an external monitor for further processing.

It is to be understood that if a 980 nm wavelength pump source is used for EDFA component 12A, this choice may restrict the distance that light will be able to propagate when performing OTDR measurements, due to high loss within the fiber. Additionally, it is common for an optical signal at the 980 nm wavelength to become multimode as it propagates along a fiber span (even when the span comprises single mode fiber). Thus, this particular embodiment (using a 980 nm pump source) is best suited with arrangements including relatively short fiber spans (such as within control office equipment). If, on the other hand, a 1480 nm pump source is used, the performance of the fiber analysis portion of module 110 will be more than sufficient, since the fiber loss associated with a 1480 nm signal is on the order of 0.25 dB/km. Additionally, the 1480 nm signal will retain its single mode profile within these fiber spans.

As shown, FIG. 3 provides an embodiment where pump source 122 can be switched into either EDFA component 12A, or to either one of the connections (ports 134 and 140) used for OTDR measurements. This allows for characterization of either the input fiber span or the output fiber span to be performed. The specific configuration of analysis arrangement 124 is thus capable of operating in one of three modes: amplification of a propagating optical signal; OTDR measurements of the input fiber span; OTDR measurements of the output fiber span.

Figure 4:
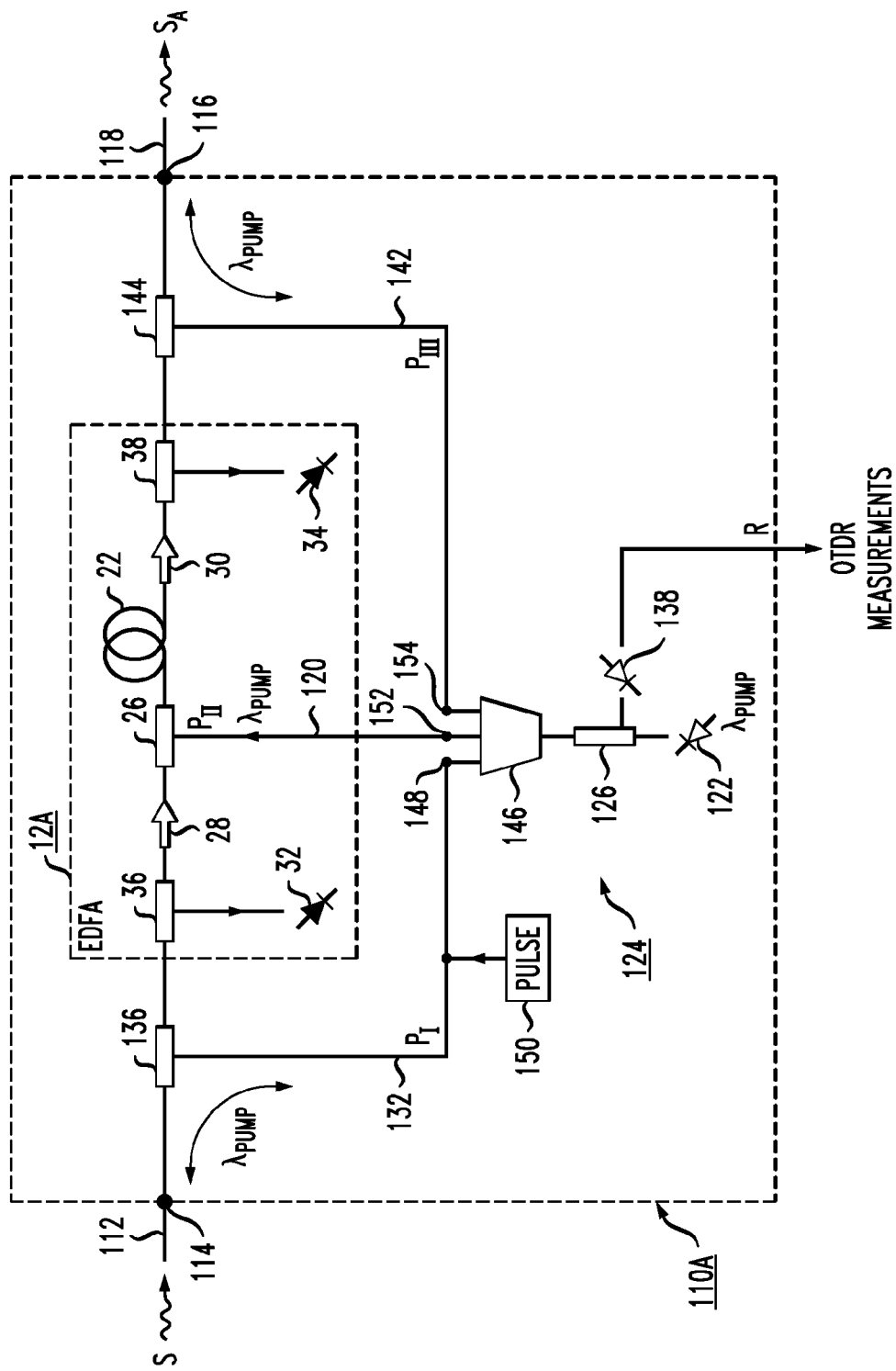
FIG. 4 is an alternative arrangement of this second embodiment, in this case where the switching element is replaced by a power splitter such that amplification and characterization can be performed at the same time.

FIG. 4 illustrates an alternative configuration of this embodiment, where optical switch 128 is replaced with an optical power splitter 146. Optical splitter 146 is a passive device which is used to divide the incoming pump light into separate portions and direct each portion along a different signal path. As shown, a first portion P, of pump light P is directed into a first output port 148 of splitter 146, where first output port 148 is coupled to signal path 132 and directs first portion P, to be used to perform OTDR measurements of input fiber span 112 (with a pulse generator 150 used in embodiments where it is desired to perform pulsed OTDR measurements). A second output port 152 of splitter 146 receives a second portion of the pump signal, denoted $P_{II}$, which is thereafter coupled into pump signal path 120 and used to provide amplification within EDFA component 12A. A third output port 154 of splitter receives the third and final portion of the pump signal, denoted $P_{III}$, which is then passed along signal path 142 and WDM 144 to perform OTDR measurements of output fiber span 118. In this case, if a rapid pulse or phase scheme is used for the OTDR measurements, it will then be feasible to simultaneously perform OTDR measurements and provide amplification to the communication signal. The specific configuration of optical power splitter 146 may be configured such that a higher fraction of the optical power is directed into EDFA component 12A (thus providing an acceptable amount of gain), with lesser fractions utilized to perform OTDR measurements. For example, a power split such as 10:80:10 may be provided at output ports 148, 152 and 154, respectively.

Figure 5:
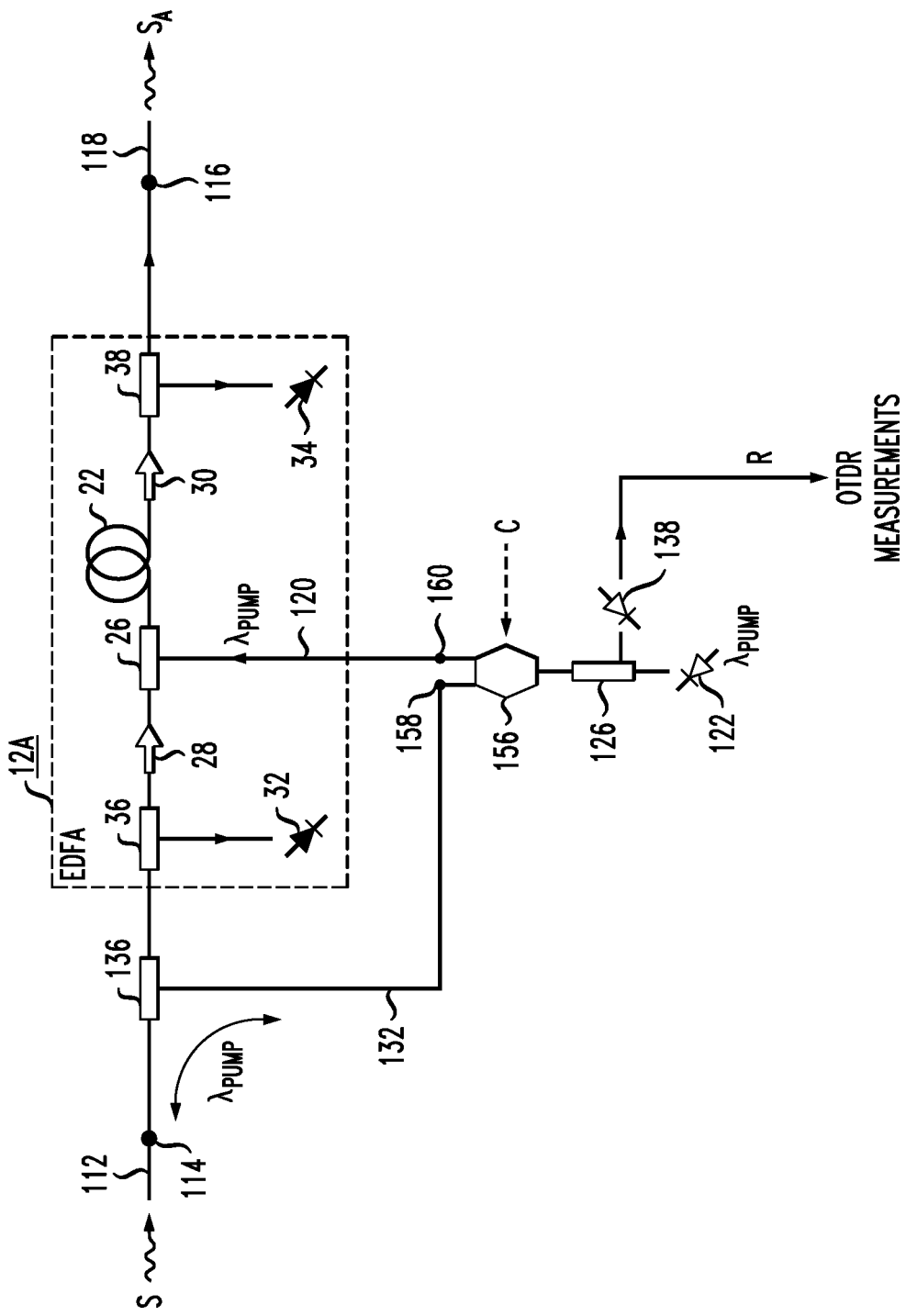
FIG. 5 illustrates a modification of the arrangement of FIG. 4, where in this case only "downstream" fiber span characterization is performed (in conjunction with amplification)

It is to be understood that the configurations as shown in FIGS. 3 and 4 may be modified such that the OTDR measurements are limited to be performed on only the input fiber span or the output fiber span. FIG. 5 illustrates an alternative configuration that is used to provide amplification and perform OTDR measurements on the input fiber span 112. In the configuration shown in FIG. 5, a 1×2 element 156 is used to direct the pump signal into either or both of the OTDR measurement component and EDFA component 12A. In the configuration shown in FIG. 5, 1×2 element 156 may comprise either a switch or a splitter, as desired, with the switch embodiment controlled by signal C, as shown in phantom. As shown, a first output port 158 of element 156 is coupled to signal path 132, which is used to direct the light into input fiber span 112 for OTDR measurements. A second output port 160 of element 156 is used to provide the light along signal path 120 and thereafter into doped fiber 22 to create gain in the optical communication signal pass through EDFA component 12A.

Figure 6:
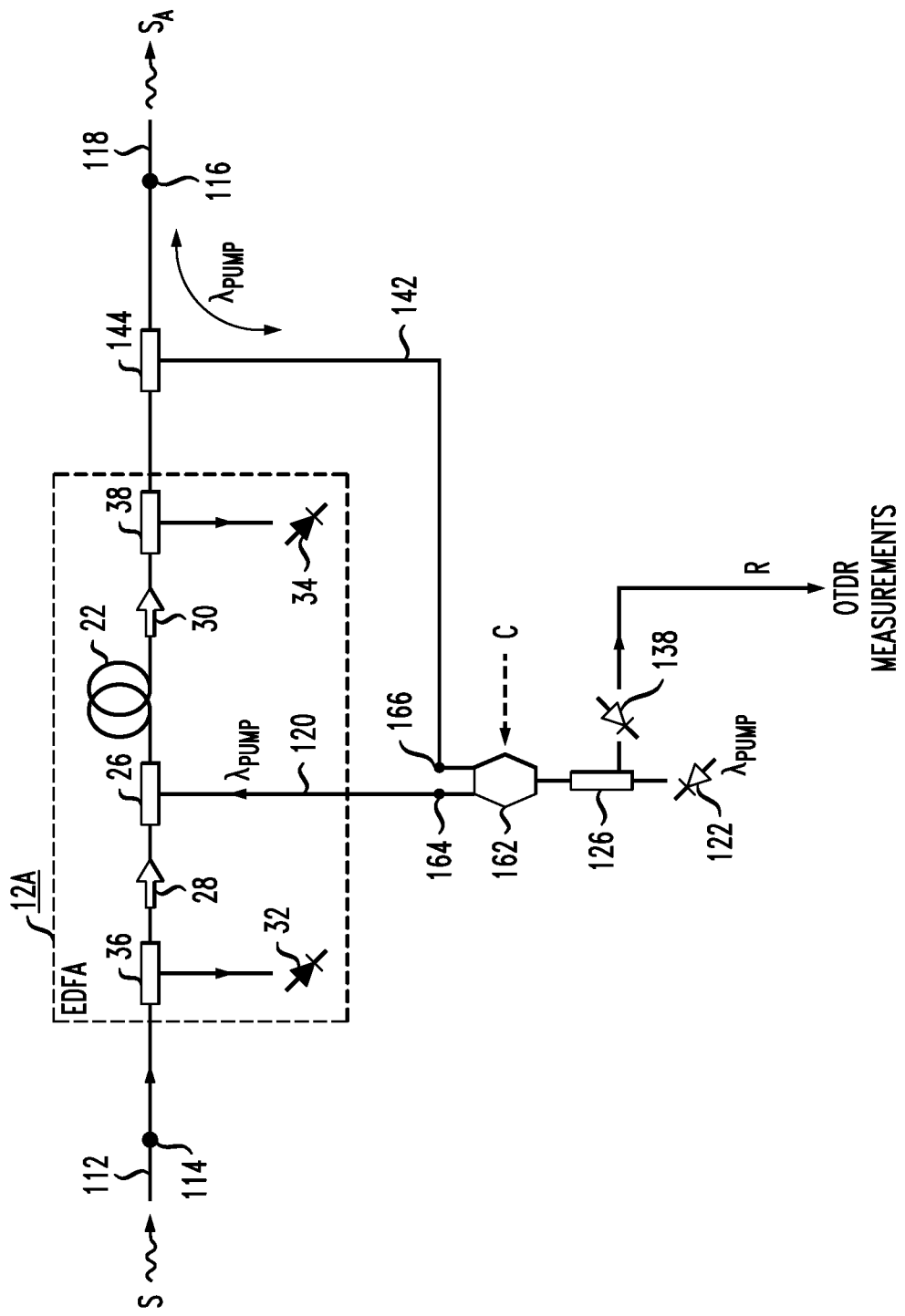
FIG. 6 illustrates another modification of the arrangement of FIG. 4, where in this case only "upstream" fiber span characterization is performed.

FIG. 6 illustrates a modification to the configuration of FIG. 5, in this case utilizing a 1×2 element 162 (either a splitter or switch) to provide light as the "pump" at port 164 which propagates along signal path 120 and into EDFA component 12A, and also provide light (as the OTDR "probe") at port 166. As shown, the output signal appearing at port 166 is coupled into signal path 142 and passes through output WDM 144 to perform OTDR measurements on output fiber span 118.

Figure 7:
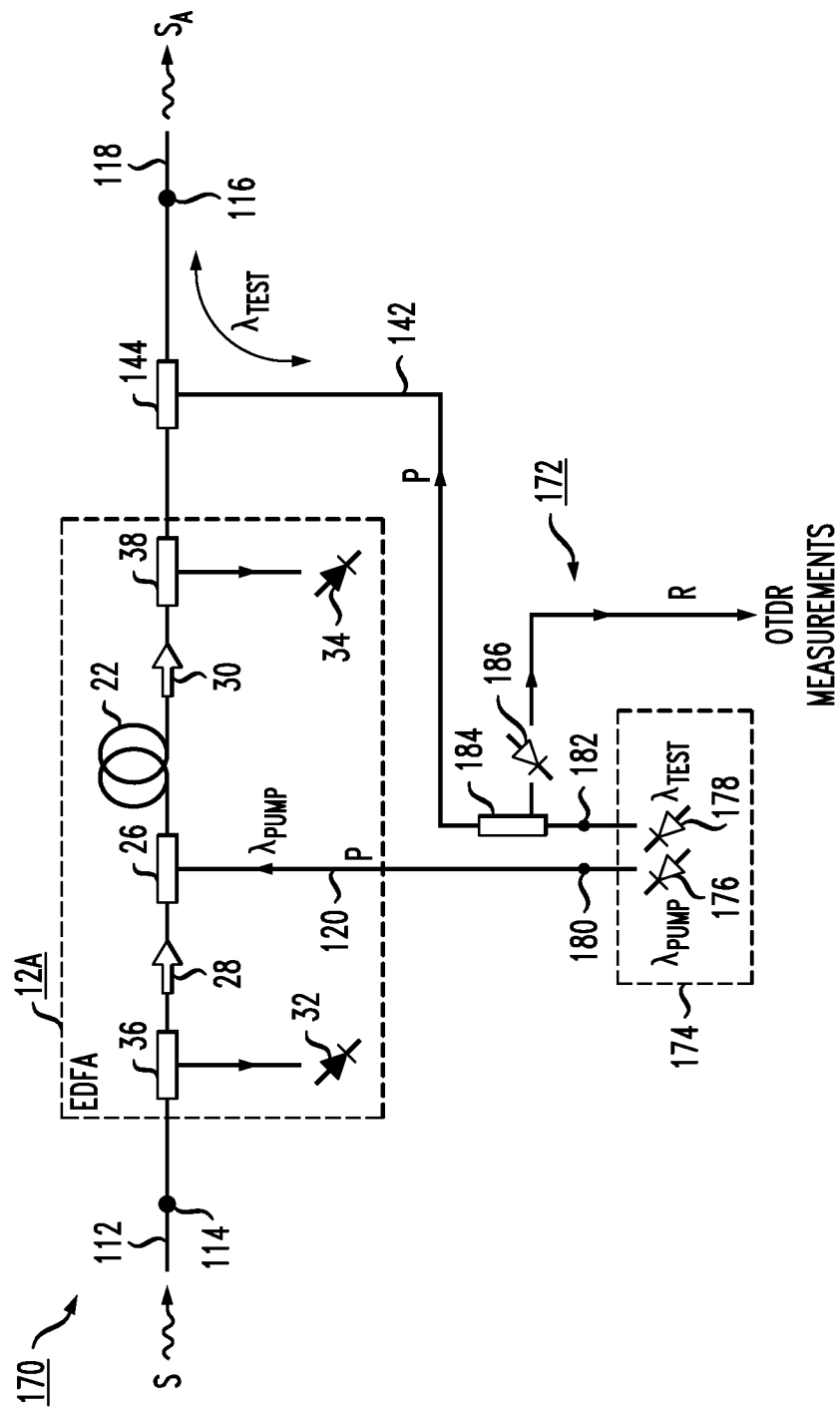
FIG. 7 illustrates a third embodiment of the present invention, in this case where a "dual chip" pump source is utilized, with one laser used for amplification and the other used for optical metrology purposes.

FIG. 7 illustrates an integrated EDFA-OTDR module 170 formed in accordance with the present invention where a fiber analysis arrangement 172 is formed to include a "dual-chip" laser source 174. In this case, dual-chip laser source 174 includes a first laser diode 176 used as the pump source (and operating at pump wavelength $\lambda_{pump}$) and a second laser diode 178 used as the OTDR probe source (and operating at a wavelength $\lambda_{test}$ best-suited for OTDR measurements). In this configuration, pump light p is input along signal path 120 to EDFA 12A without any interruption (i.e., no need to switch between amplification and measurement functions). By using a separate test laser source 178, this configuration of FIG. 7 is able to use probe light at a wavelength that is best suited for use with characterizing relatively long fiber spans.

As shown in FIG. 7, pump light p output from laser diode 176 passes through a first output port 180 of dual-chip source 174 and is coupled into signal path 120, which then applies the pump light as an input to EDFA component 12A. The OTDR probe light P output from laser diode 178 is shown as passing through a second output port 182 of dual-chip source 174 and a circulator 184 into signal path 142. As before, probe light P is directed by output WDM 144 into output fiber span 118. In the return direction, the reflected light is re-directed by output WDM 144 along signal path 142. In this case, circulator 184 directs the reflected light into a photoreceiver 186, which converts the received optical signal into the equivalent electrical signal R, used to perform the same type of power measurement and generation of OTDR diagrams as in the manner described above.

Figure 8:
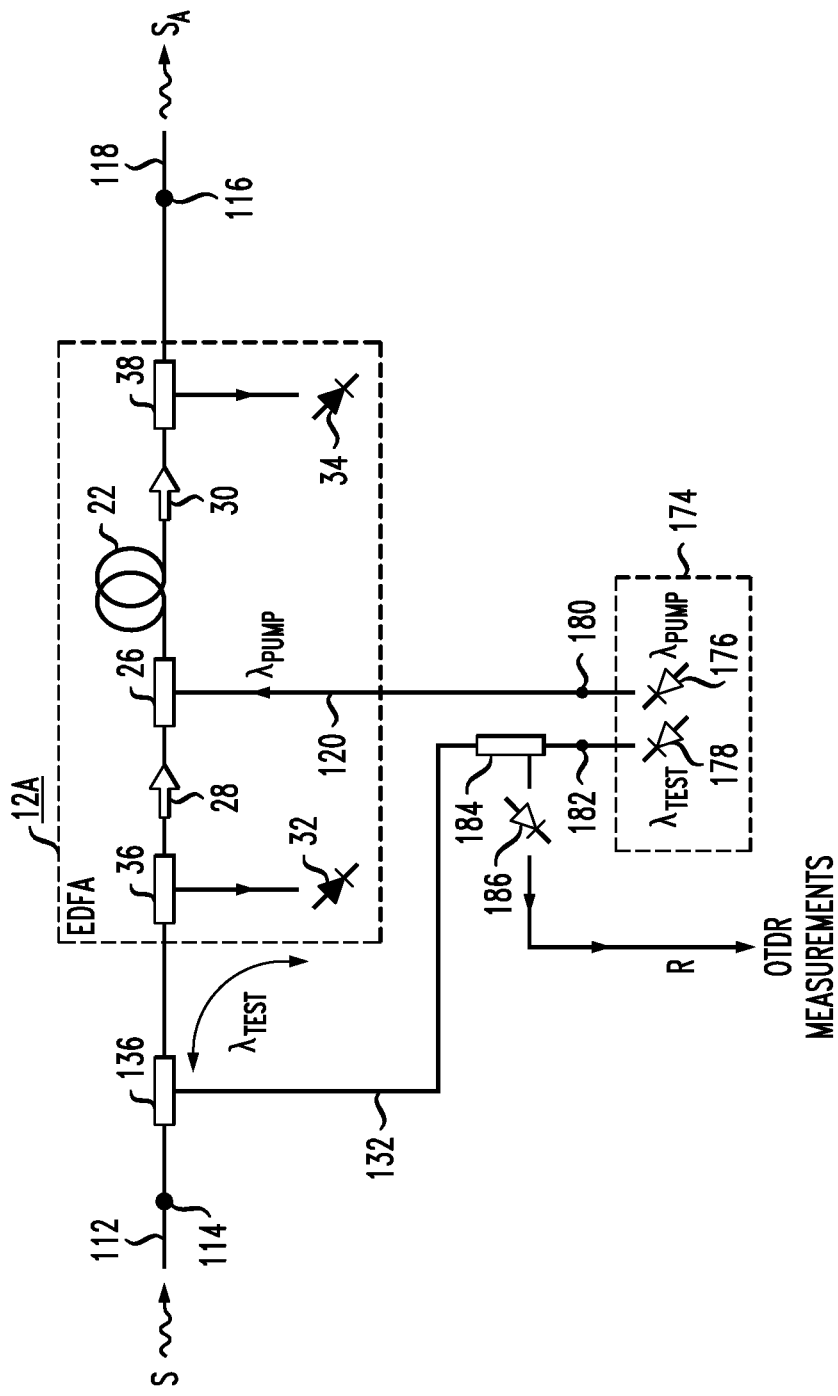
FIG. 8 is an alternative arrangement of this third embodiment, where the OTDR portion of the module is configured to perform "upstream" testing of the fiber span entering the module.
Figure 9:
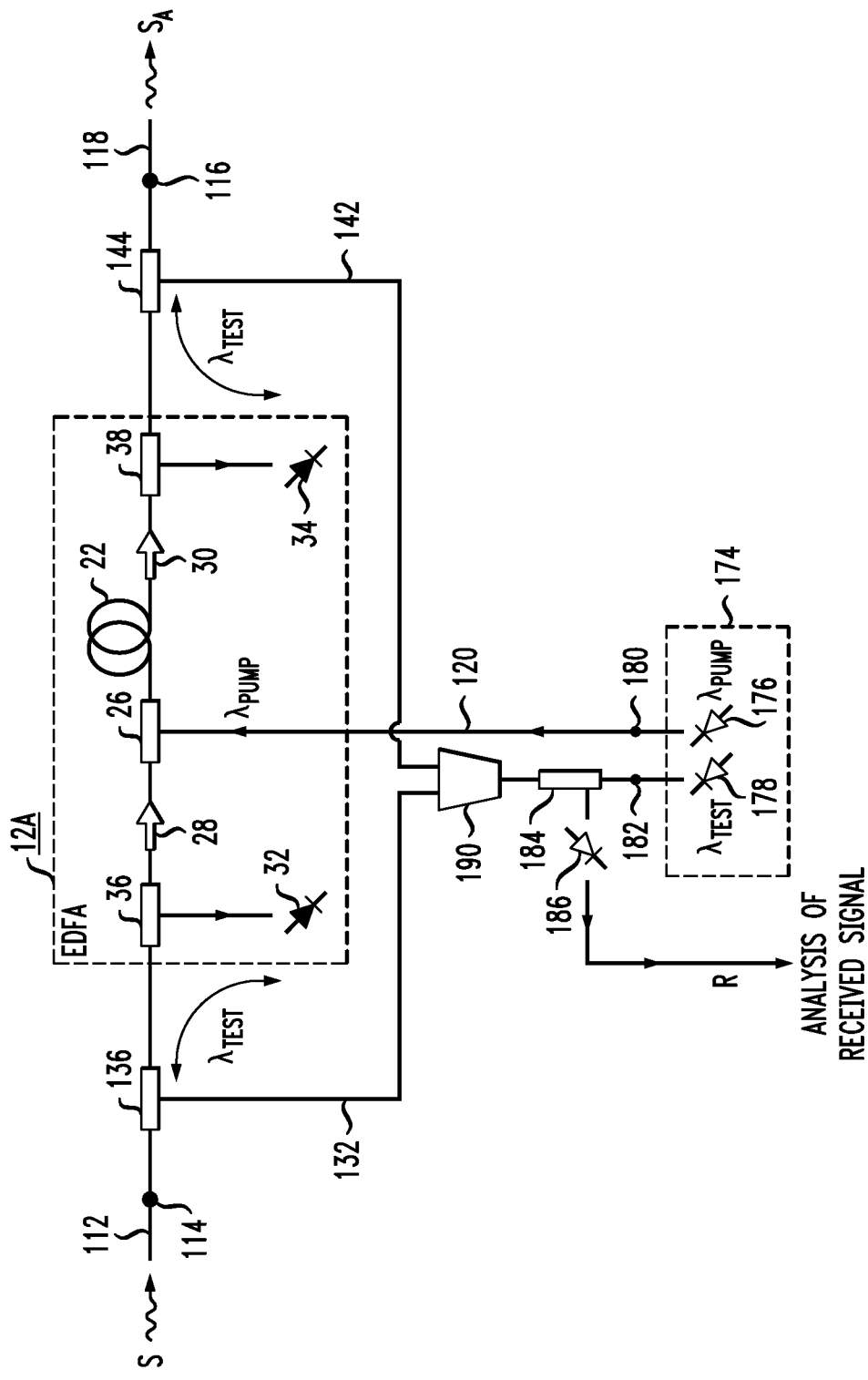
FIG. 9 is another alternative arrangement of the third embodiment, in this case incorporating a switch to control the selection of the fiber span to be characterized.

FIG. 8 illustrates a variation of the configuration of FIG. 7, in this case used to provide OTDR measurements of input fiber span 112. Again, dual-chip laser source 174 contains pump laser diode 176 for providing the pump light input directly to EDFA component 12A and test laser diode 178 for providing probe light to be injected along input fiber span 112. As before, the return, reflected light from input fiber span 112 is directed through circulator 184 and into photoreceiver 186 for further analysis. A variation of FIGS. 7 and 8 is shown in FIG. 9, where the embodiment of FIG. 9 is capable of providing OTDR measurements along both input fiber span 112 and output fiber span 118 with a minimal amount of additional components. As before, dual-chip laser source 174 is used to provide both the pump light output (from laser diode 176) and the test probe light output (from laser diode 178). In this case, an optical switch 190 is coupled to the output of circulator 184 and is used to direct the test probe light along a selected output signal path (under the direction of a control signal C). As shown, a first output port 192 of switch 190 is coupled to signal path 132 and used to direct the probe light into input fiber span 112 for measurement purposes. Similarly, a second output port 194 of switch 190 is coupled to signal path 142 and is used to direct the probe light into output fiber span 118, where the selection of measurement of either input fiber span 112 or output fiber span 118 is directed by an external control signal. As with the other configurations, the return probe light passes through circulator 184 and into photoreceiver 186 to create the electrical signal R used for OTDR analysis purposes.

Besides performing OTDR, other analyses of a fiber span are often useful, such as methodologies used to measure the length of the span and the type of chromatic dispersion (CD) present along the span. Chromatic dispersion measurements require the ability to measure the time an optical signal of a known wavelength travels in a span of optical fiber. By repeating this measurement for a number of separate wavelengths, the resulting chromatic dispersion parameters (group velocity, delay, etc.) can be determined. Inasmuch as a number of different wavelengths are required, the various arrangements described thus far are precluded from determining this information.

Figure 10:
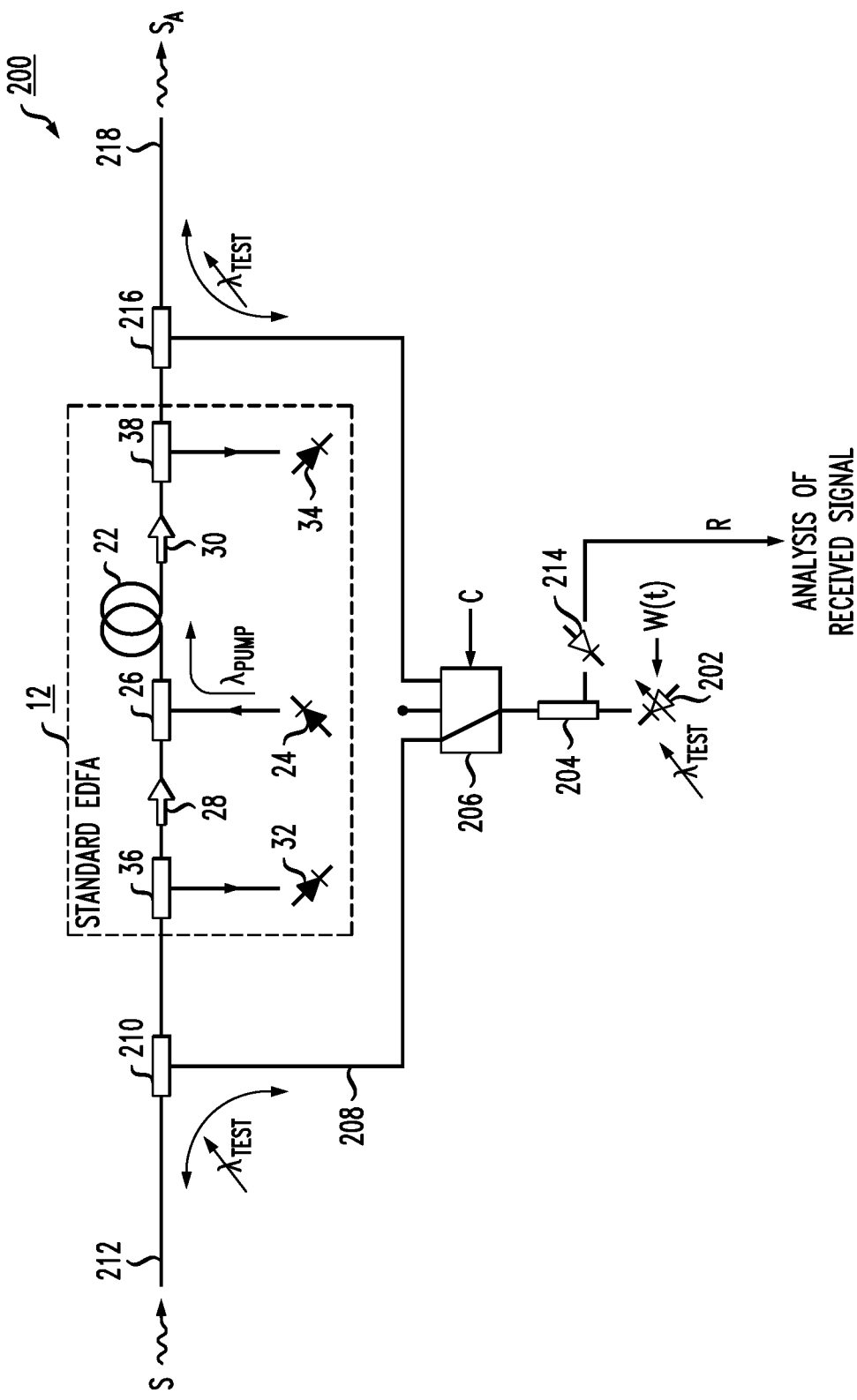
FIG. 10 illustrates a fourth embodiment of the present invention, in this case where a tunable laser source is used, where this source is used to provide the pump wavelength during amplification and otherwise one or more wavelengths required for fiber span characterization (particularly well-suited for performing chromatic dispersion analysis)

FIG. 10 illustrates an alternative embodiment of the present invention that is able to provide a measurement of chromatic dispersion, as well as the other OTDR measurements discussed above. An integrated EDFA/optical metrology module 200 is shown in FIG. 10 as including a conventional EDFA 12, similar to the configurations of FIGS. 1 and 2, where a pump source 24 is included within EDFA 12 and used to amplify the communication signal S passing through module 200. In order to provide measurement of chromatic dispersion, module 200 is shown as including a tunable laser source 202, where source 202 is controlled by an external source to produce an output signal at a changing wavelength value over time (i.e., to "sweep" through a defined wavelength range during a set period of time). As shown, the output from tunable laser source 202 is passed through a circulator 204 and applied as an input to an optical switch 206. In the specific configuration shown in FIG. 10, optical switch 206 is positioned such that the output from tunable laser source 202 is coupled into an optical signal path 208, so as to perform an "upstream" measurement of chromatic dispersion. In particular, the tunable wavelength signal is passed through an input WDM 210 and thereafter coupled into input fiber span 212. A wavelength tuning signal W(t) is applied as a control input to tunable laser 202, and is used to change the wavelength of the measurement signal that is introduced into input fiber span 212. As with the OTDR measurements, the return signals are re-introduced into signal path 208 by input WDM 210, where they are thereafter directed by circulator 204 into a photoreceiver 214 for transformation into an electrical equivalent signal R, used in further analysis for determining the chromatic dispersion of input fiber span 212.

In one process, a plurality of pulses (similar to those used as OTDR probe pulses in certain configurations) is transmitted into the span, and a measurement of signal loss as a function of time is collected by photoreceiver 214. For the purposes of chromatic dispersion measurements, photoreceiver 214 is necessarily a broadband device that is capable of functioning with signals across the entire spectrum associated with tunable laser source 202. Using the data collected by photoreceiver 214 at several different wavelengths, the differential time for the pulses to be received can be used to calculate the chromatic dispersion of the fiber. Inasmuch as the chromate dispersion is a distinctive quality of different types of fiber, the performance of this measurement allows for module 200 to determine the type of fiber that has been installed along the span.

Obviously, when optical switch 206 is controlled to select the "downstream" direction, the tunable wavelength signal will be coupled into signal path 214, pass through an output WDM 216 and be coupled into an output fiber span 218.

Figure 11:
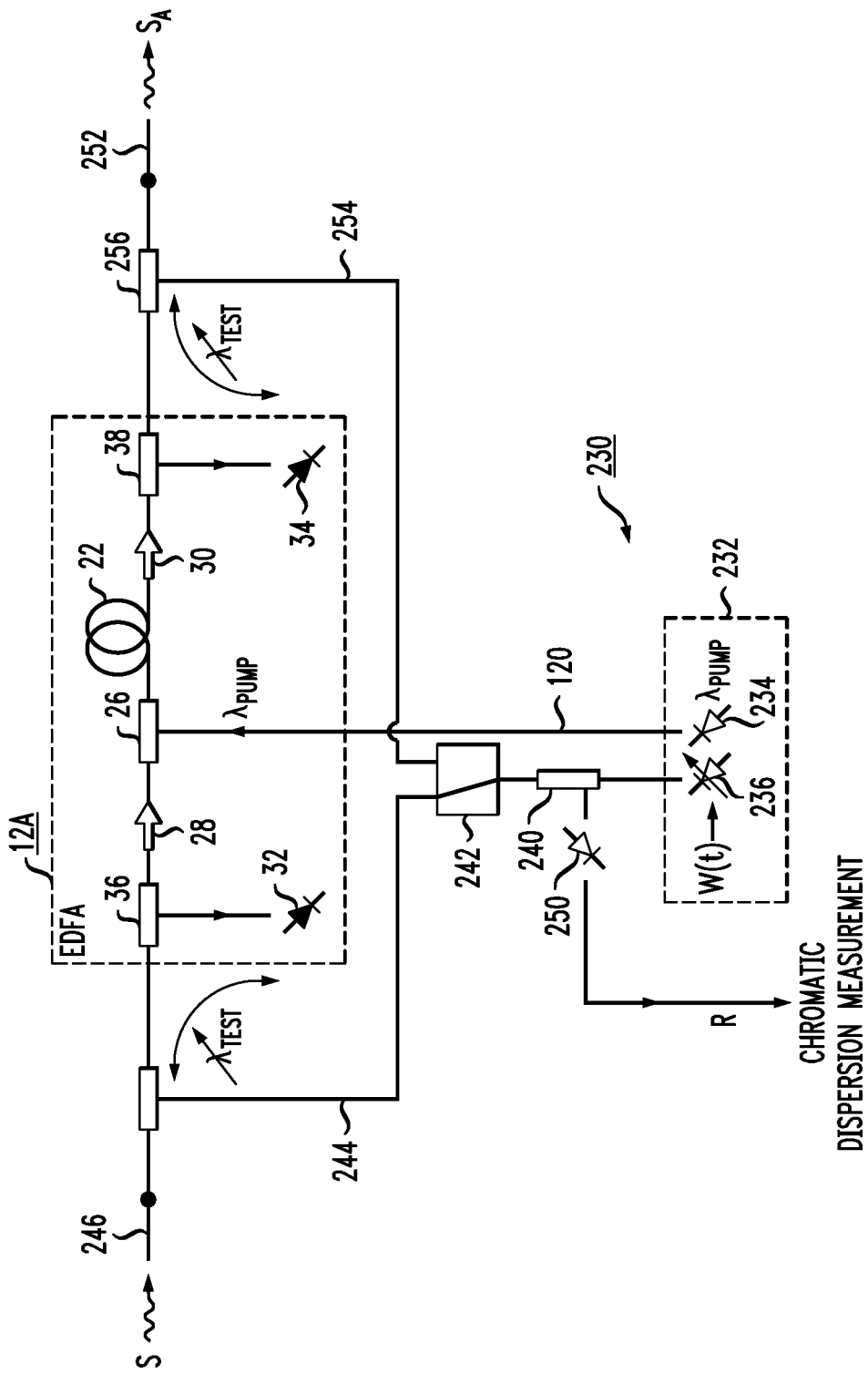
FIG. 11 is an alternative configuration of the embodiment of FIG. 10, in this case using a multi-laser source, with one laser source dedicated as the pump source for the EDFA, and a tunable laser source (or an array of separate lasers) used for fiber span characterization.

Instead of a tunable wavelength source, an array of separate laser diodes operating at different wavelengths may be used, where each separate source is activated in turn to perform the measurements for that particular wavelength. In another embodiment, as shown in FIG. 11, a module 230 can be formed to utilize a "dual-chip" source 232, similar to those described above, where a pump laser diode 234 is housed with a tunable laser 236. As above, the output pump signal from pump laser diode 234 is coupled into signal path 120 and provided as an input to EDFA component 12A. The output from tunable laser 236 passes through a circulator 240 and is applied as an input to an optical switch 242. In the configuration of FIG. 11, optical switch 242 is set to perform chromatic dispersion measurement of the "upstream" signal path 246. In particular, the tunable laser signal is coupled into an optical signal path 244 and passed through an input WDM 248 so as to be injected into input fiber span 246. Again, measurements are made at various wavelengths, as controlled by signal W(t) applied to tunable laser source 236. The return signal is directed along signal path 244 and through optical switch 242 and circulator 240 into a photoreceiver 250 for conversion into electrical equivalent R for analysis. Again, photoreceiver 250 is required to be a wideband photoreceiver that is able to properly handle signals across the entire spectrum used for this chromatic dispersion measurement.

When optical switch 242 is actuated to switch signal paths, a chromatic dispersion measurement of output fiber span 252 can be performed in a similar manner (using signal path 254 and output WDM 256). In any event, by virtue of using separate laser sources for chromatic dispersion measurement and signal amplification, the measurement can be performed at the same time that EDFA 12A is performing amplification of a propagating communication signal S. to be used to perform chromatic dispersion measurements of either input fiber span 242 or output fiber span 252.

While the foregoing is directed to embodiments according to the present invention, other and further embodiments may be devised without departing from the basic scope thereof, and the scope thereof is determined by the claims that follow.

What is claimed is:

1. An optical device coupled to an input fiber span at an input port and an output fiber span at an output port, the device comprising
   a doped fiber amplifier component including
     a section of doped optical fiber;
     a first coupling element for receiving an incoming optical communication signal propagating along the input fiber span and inserting the optical communication signal into the section of doped fiber;
     a second coupling element for receiving an optical pump signal and inserting the optical pump signal into the section of doped fiber; and
     a third coupling element disposed at the output of the doped fiber amplifier for receiving an amplified version of the optical communication signal and inserting the amplified optical communication signal into the output fiber span; and
   an optical metrology arrangement coupled to one or more of the first, second and third coupling elements of the doped fiber amplifier, the optical metrology arrangement including
     an optical laser source for generating optical probe light at a predetermined wavelength and introducing the generated optical probe light along either one or both of the input fiber span, via the first coupling element, and the output fiber span, via the third coupling element; and
     a photoreceiver for accepting reflected probe light and measuring the reflected optical power in a manner that is utilized to determine physical properties and optical characteristics of the associated optical fiber span.

2. An optical device as defined in claim 1 wherein
   the doped fiber amplifier includes a laser source for generating the optical pump signal at a predetermined pump wavelength $\lambda_{pump}$, and coupling the optical pump signal into the section of doped fiber via the second coupling element; and
   the optical metrology arrangement includes
     an optical source for generating optical probe light operating at a wavelength $\lambda_{test}$ separate and distinct from $\lambda_{pump}$, the probe light utilized to perform optical time domain reflectometry (OTDR) measurements for either one or both of the input fiber span and the output fiber span;
     a photoreceiver for accepting return reflected light created along a measured fiber span; and
     an optical coupling arrangement for directing created probe light toward the measured fiber span and directing return reflected light into the photoreceiver for analysis and generation of fiber span characteristics from the OTDR measurements.

3. The optical device as defined in claim 2 wherein the optical metrology arrangement is coupled to a single one of the input and output fiber spans.

4. The optical device as defined in claim 2 wherein the optical metrology arrangement is coupled to both of the input fiber span and the output fiber span.

5. The optical device as defined in claim 4 wherein the optical metrology arrangement comprises a first metrology unit coupled to the input fiber span and a second metrology unit coupled to the output fiber span, each metrology unit including its own optical source, photoreceiver and optical coupling arrangement.

6. The optical device as defined in claim 4 wherein the optical metrology arrangement comprises a single metrology unit coupled to both the input fiber span and the output fiber span.

7. The optical device as defined in claim 6 wherein the optical metrology arrangement is coupled to the input and output fiber spans by an included optical switch, wherein the optical switch is operated to send the probe light into the input fiber span when the switch is in a first position and to send the probe light into the output fiber span when the switch is in a second position.

8. The optical device as defined in claim 7 wherein the optical switch includes a third output position that terminates the propagation of the probe light to discontinue the OTDR measurement process.

9. The optical device as defined in claim 6 wherein the optical metrology arrangement is coupled to the input and output fiber spans by an included optical power splitter, such that a first probe output is directed into the input fiber span and a second probe output is directed into the output fiber span.

10. The optical device as defined in claim 1 wherein the optical laser source of the optical metrology arrangement further comprises a tunable laser source for introducing a range of wavelengths into either one or both of the input and output fiber spans so as to collect additional information used to determine a chromatic dispersion characteristic of the measured fiber span.

11. The optical device of claim 1 wherein the doped fiber amplifier component and the optical metrology arrangement share the optical laser source disposed within the optical metrology arrangement, wherein
    the doped fiber amplifier includes an optical pump light path for introducing pump light into the second coupling element; and
    the optical laser source of the optical metrology arrangement generates optical pump light at the predetermined pump wavelength $\lambda_{pump}$, the optical pump light thereafter passing through a coupling arrangement and injected into the optical pump light path of the doped fiber amplifier, the optical laser source further comprising an arrangement for coupling the optical output as probe light into either one or both of the input and output fiber spans to perform optical measurements therealong.

12. The optical device of claim 11 wherein the optical metrology arrangement further comprises an optical switch for receiving the optical pump light output of the optical laser source, the optical switch including a set of three output ports and controlled so as to provide the optical pump light to a selected one of the input fiber span, the doped fiber amplifier, and the output fiber span.

13. The optical device of claim 11 wherein the optical metrology arrangement further comprises an optical splitter for receiving the optical pump light output of the optical laser source, the optical switch including a set of three output ports and utilized to divide the optical pump signal into a set of three separate output pump signals, with a separate one coupled to each one of the input fiber span, the doped fiber amplifier, and the output fiber span.

14. The optical device of claim 1 wherein the doped fiber amplifier component and the optical metrology arrangement share the optical laser source disposed within the optical metrology arrangement, wherein
    the doped fiber amplifier includes an optical pump light path for introducing pump light into the second coupling element; and
    the optical laser source of the optical metrology arrangement comprises a first laser diode for generating the optical pump light at the predetermined pump wavelength $\lambda_{pump}$, the optical pump light thereafter passing through a coupling arrangement and inserted into the optical pump light path of the doped fiber amplifier, the laser source further comprising a second laser diode for generating an optical probe test light output at a predetermined test wavelength $\lambda_{test}$ and coupling the optical probe test light into either one or both of the input and output fiber spans to perform optical measurements therealong.

15. The optical device as defined in claim 14 wherein the second laser diode of the laser source is coupled to the input and output fiber spans by an included optical switch, wherein the optical switch is operated to send the probe test light into the input fiber span when the switch is in a first position and to send the probe test light into the output fiber span when the switch is in a second position.

16. The optical device as defined in claim 14 wherein the second laser diode of the laser source is coupled to the input and output fiber spans by an included optical power splitter, such that a first output of test probe light is directed into the input fiber span and a second output of test probe light is directed into the output fiber span.

17. The optical device as defined in claim 14 wherein the second laser diode comprises a tunable wavelength laser diode for performing chromatic dispersion measurements along a selected fiber span.

18. The optical device as defined in claim 14 wherein the optical laser source further comprises an array of lasers operating at different test wavelengths, the array operated sequentially to perform chromatic dispersion measurements along a selected fiber span.

19. The optical device as defined in claim 1 wherein the doped fiber amplifier comprises an erbium-doped fiber amplifier and $\lambda_{pump}$ is selected to be either 980 nm or 1480 nm.

20. The optical device as defined in claim 1 wherein the first, second and third coupling elements comprises wavelength division multiplexers.

* * * * *